United States Patent [19]

Le Cardonnel

[11] 3,835,258

[45] Sept. 10, 1974

[54] RING TRIP CIRCUIT

[75] Inventor: Gerhard Marcel Le Cardonnel, Neuilly-sur-Seine, France

[73] Assignee: International Standard Electric Corporation, New York, N.Y.

[22] Filed: Feb. 1, 1973

[21] Appl. No.: 328,706

[30] Foreign Application Priority Data

Feb. 17, 1972 France .............................. 72.05290

[52] U.S. Cl. .......................... 179/18 HB, 179/18 F

[51] Int. Cl. .......................................... H04m 3/02

[58] Field of Search........... 179/18 HB, 84 A, 84 L, 179/84 R, 18 F, 18 FA, 2 A; 178/4.1 R, 4.1 C; 331/65

[56] References Cited

UNITED STATES PATENTS

| | | | |
|---|---|---|---|
| 3,312,787 | 4/1967 | Jorgensen | 179/18 HB |
| 3,529,087 | 9/1970 | Kawase et al. | 179/2 A |
| 3,641,552 | 2/1972 | Friberg | 331/65 |
| 3,683,118 | 8/1972 | Vago et al. | 179/18 HB |

*Primary Examiner*—Thomas A. Robinson
*Attorney, Agent, or Firm*—J. B. Raden; D. P. Warner

[57] ABSTRACT

An electronic circuit is disclosed for detecting when a telephone handset is lifted in response to ringing tone and for providing a voltage which operates a relay to interrupt the transmission of ringing current. The circuit includes an oscillator controlled by the d.c. potential difference across a resistor in series with a wire carrying ringing current to the telephone line. The oscillator is coupled through transformer windings to the circuits to be controlled.

4 Claims, 2 Drawing Figures

RING TRIP CIRCUIT

BACKGROUND OF THE INVENTION

1. Field of the Invention

The present invention relates to a ringing trip circuit utilizable in a telephone exchange to detect the lifting by a subscriber of the handset of a called station. The circuit immediately interrupts the transmission of the ringing current when the handset is lifted.

2. Description of the Prior Art

In a telephone exchange, when a subscriber is called, the exchange sends on his line an alternating current which operates the bell of the called subscriber's set. This current generally originates from a source of a relatively high alternating voltage (several tens of volts) the frequency of which is of about a few tens of hertz. As soon as the subscriber lifts the handset the transmission of this ringing current must stop to avoid its being heard in the receiver of the handset. For that purpose, it is quite usual to connect in the exchange in series with the ringing alternating current source, a direct current source. As long as the handset of the subscriber's set is in place on the hookswitch, the ringing circuit only is connected to the line wires. A capacitor, in this ringing circuit, prevents direct current from flowing. When the subscriber lifts the handset, the ringing circuit is disconnected from the line wires and the speech circuit is connected instead, thus enabling the flow of direct current without preventing the flow of alternating current. The detection of the lifting of the handset of a called subscribers set will be consequently made by detecting the flow of a direct current on the line wires, in the presence of the ringing current. It can be imagined that such a function, placed in the charge of the ringing trip circuit, presents difficulties, because of the high voltage and of the low frequency of the ringing current.

Different circuits employing relays specially designed to provide this function are well known. By comparison with the relays of a conventional type and all the more with the miniaturized relays now available on the market, these relays are very expensive and present drawbacks such as large size, great weight and difficulties of adjustment. As the present trend consists in using electronic components, it has become advisable to realize an electronic ringing trip circuit from which could be expected a decrease in volume and weight, requiring no adjustment, an improvement of reliability and life time, and an absence of current consumption when the circuit is idle. Such is the case with the circuits described in the Franch patent applications No. 71 41072 and No. 72 04108, filed respectively on the 17th of Nov. 1971 and on the 8th of Feb. 1972, by the applicant under the title: "Circuit d'arret de sonnerie" (Ringing trip circuit).

Each of these circuits comprises a resistor in series on a wire of the subscriber's line, a low-pass filter connected across the resistor and a detecting device connected to the output of the filter having the function of detecting the flow of direct current in the resistor. This detecting device controls the operation of a switching device which interrupts the flow of the ringing current. In the French patent application No. 71 41072, already mentioned, the detecting device and the switching device are constituted, more particularly, by a diodephototransitor couple. This solution offers the advantage of separating completely the line from the electronic circuits and other circuits thanks to the optical link. In the French patent application No. 72 04108, previously mentioned, these devices are circuits with transistors. The detecting device then comprises, more particularly, a detecting transistor arranged so as to be fed by the current flowing on the line. In this case, the detecting device is economical, but the galvanic decoupling between the line and the electronic circuits is not so great as with the opto-electronic solution.

SUMMARY OF THE INVENTION

The invention provides a ringing trip circuit the detecting device of which is of a different type. It fulfills the functions and resolves the difficulties previously defined while providing the advantages of the two previous solutions.

This circuit is characterized in that the detecting device includes an oscillator connected to the output of a filter, a transformer the primary winding of which is connected to the output of the oscillator, and a switching device connected to the secondary winding of the transformer. These different means are arranged in such a way that in the absence of direct current in the resistor, the oscillator remains cut-off, while in the presence of direct current in the resistor, the d.c. voltage appearing at the output of the filter enables the operation of the oscillator. When operated, the oscillator applies an alternating signal to the primary winding of the transformer giving rise to an alternating current induced in the secondary winding. This current controls the operation of the switching device.

BRIEF DESCRIPTION OF THE DRAWINGS

Different objects and features of the invention will become more apparent from the following description of a preferred embodiment thereof, taken in conjunction with the accompanying drawings, wherein.

DESCRIPTION OF PREFERRED EMBODIMENTS

Figure 1:
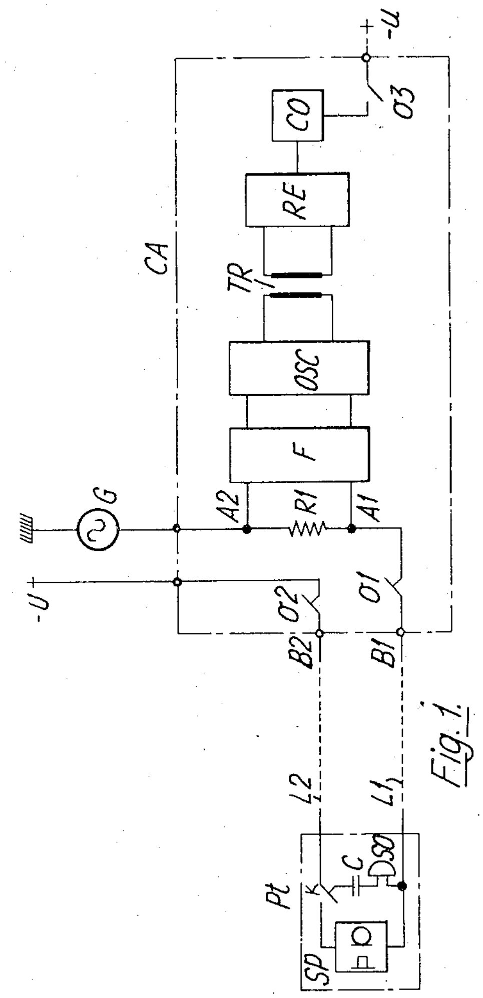
FIG. 1, shows the diagram of an embodiment of the ringing trip circuit of the invention.

The diagram of an embodiment of the ringing trip circuit of the invention will be first described with reference to FIG. 1.

This diagram comprises a subscriber's set Pt, a telephone line with two wires L1 and L2, and a ringing trip circuit CA.

The subscriber's set Pt is connected to wires L1 and L2. It comprises a ringing circuit including, in addition to bell SO, a capacitor C, a speech circuit SP and a contact K controlled by the hook switch of the set.

The telephone line can be connected to terminals B1 and B2 in order to be fed by a direct current source, between a zero volt potential (earth) and a negative potential -U, and by a ringing alternating current generator G, in this case in series with the feeding terminal connected to the earth.

The ringing trip circuit CA comprises a resistor R1 in series between wire L1 and generator G, a low-pass filter F connected to terminals A1 and A2 of resistor R1 and suppressing the alternating current, an oscillator OSC connected to the output of filter F, a transformer TR the primary winding of which is connected to the output of oscillator OSC, a rectifier RE connected to the secondary winding of transformer TR, a switching device CO connected to the output of rectifier RE, operating under the control of the current supplied by the rectifier and controlling the operation of contacts 01, 02 and 03.

If it is supposed that the line wires L1, L2 are connected to terminals B1, B2, and contacts 01, 02 are in rest condition (position represented on the figure), the line is fed by the direct current source and the alternating current source. When the handset of set Pt is in place on the hookswitch, contact K is in rest condition. An alternating current flows on the line wires L1, L2 through the ringing circuit of set Pt, causing the bell SO to operate, but no direct current can flow because of the presence of capacitor C. The difference of potential between the terminals A1 and A2 of resistor R1 results only from the alternating current. Filter F prevents a current resulting from the alternating difference of potential from flowing towards oscillator OSC.

When the subscriber of station Pt lifts the handset of his station, contact K changes its position. Ringing circuit (SO - C) is disconnected (the bell SO stops operating) while the speech circuit SP is connected to wires L1, L2. The direct current provided by the direct current source can flow through wires L1, L2 and speech circuit SP of station Pt. At the terminals A1 and A2 of resistor R1 there appears such a difference of potential resulting from this direct current that filter F applies a direct current to oscillator OSC. This oscillator starts operating and transmits to the primary winding of transformer TR an alternating current which causes an alternating current of the same frequency to flow in the secondary winding. This current rectified by the rectifier RE gives rise to a signal which controls the operation of the switching device CO. Contacts 01 and 02 open, isolating wires L1, L2, and interrupting the flow of the direct current and of the alternating current. Set Pt stops receiving the ringing alternating current and the oscillator stops operating. Moreover, contact 03 closes and provides an appropriate potential *-u*, transmitted by means not represented, to keep operating the switching device CO. The circuit remains in this state until the holding potential *-u* is removed from contact 03. At the removal of the potential, the switching device CO and, consequently, the whole circuit return to their initial state.

It can be consequently seen that the ringing trip circuit CA has enabled detection of the lifting of the handset of set Pt and the stoppage of the transmission of the alternating current towards the station.

Figure 2:
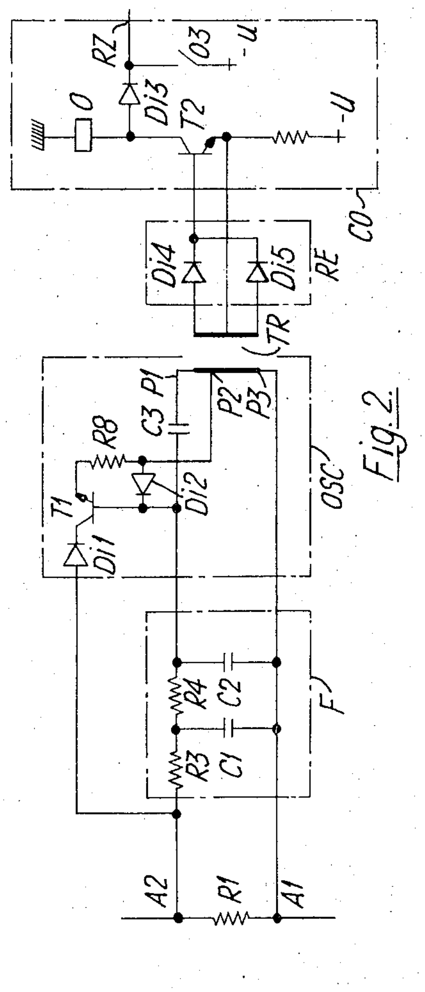
FIG. 2, a detailed embodiment of the ringing trip circuit of FIG. 1.

An embodiment of the ringing trip circuit CA of FIG. 1 will be described now with reference to FIG. 2.

Filter F is realized with resistors R3, R4 and capacitors C1 and C2.

Oscillator OSC comprises essentially a transistor T1 and the primary winding of transformer TR.

In the absence of direct current in resistor R1, the filter fulfilling its function, the average voltage across capacitor C2 is zero and the residual alternating voltage is insufficient to make transistor T1 conduct. No current flows in the primary winding of transformer TR. The transistor T2 of the switching device CO is cut-off. Relay O is not energized.

When a direct current flowing in resistor R1 is such that the potential of terminal A2 is greater than the potential of terminal A1, there appears across capacitor C2 a charging voltage enabling finally the flow of a current through the following circuit:

terminal A2, resistors R3 and R4, base-emitter junction of transistor T1, resistor R8, part P2-P3 of the primary winding of transformer TR, terminal A1. This current makes transistor T1 conducting. A current flows through diode Di1, transistor T1, resistor R8 and part P2-P3 of the primary winding of transformer TR. This current induces a current in the winding part P1-P2, which makes transistor T1 more conductive and rapidly saturates the transistor. When the current in the winding part P2-P3 stops increasing, the current in part P1-P2 decreases. Transistor T1 is no longer saturated, which decreases the current flowing through it and causes rapidly a return to the cut-off, and so on. Oscillator OSC consequently oscillates and this induces an alternating signal in the secondary winding of transformer TR.

Capacitor C3 decouples concerning the direct current the base of transistor T1 from transformer TR.

Diodes Di1 and Di2 protect the transistor against high reverse voltage peaks.

Rectifier RE comprises two diodes Di4 and Di5 made alternatively conducting by the alternating current induced in the secondary winding of transformer TR.

The switching device CO comprises, more particularly, a transistor T2, a relay O and a diode di3. When an alternating signal is induced in the secondary winding of transformer TR, the base of transistor T2 is made positive in relation to its emitter, during each alternation, thanks to diodes Di4 and Di5 of rectifier RE. Transistor T2 becomes conducting. A current flows through the winding of relay O which energizes. Contact 03 closes and applies a negative holding potential $-u$ to relay 0. Contacts 01 and 02 (see FIG. 1) open and disconnect the line wires. Oscillator OSC stops operating; transistor T2 is cut-off.

To cause relay 0 to release, it suffices to apply on wire RZ a positive voltage cutting-off diode Di3.

It can be consequently seen that the ringing trip circuit CA comprises a part including resistor R1, filter F, oscillator OSC and the primary winding of transformer TR, and galvanically connected to the line without any other current-supply than the current-supply provided by the current flowing on the line. A second part, comprising the secondary winding of transformer TR, rectifier RE and switching device CO, is electrically insulated from the first part and, consequently, from the line. The alternating current and any interference transmitted onto the line do not consequently affect directly the circuits of the second part and, particularly, the feeding circuits of the electronic circuits.

In other respects, the ringing trip circuit CA evaluates the difference of potential existing across resistor R1 inserted in series on the line. The ringing alternating current can then give rise (according to the value of resistor R1) to a small difference of potential, which enables choosing for C1 and C2 tantalum capacitors of reduced sizes. The current flowing in the ringing trip circuit CA results from the difference of potential across R1 and not from the value of the potential on the line, which protects circuits CA against the interference effects and accidental overvoltages.

Moreover, in rest condition, for instance when the line is disconnected from terminals B1 and B2, the ringing trip circuit consumes no current. Indeed, as previously indicated, oscillator OSC and transistor T2 are cut-off. This characteristic is very interesting on account of the high number of ringing trip circuits in a telephone exchange.

It is clearly understood that the preceding descriptions are made only by way of example and not as limitation to the scope of the invention.

I claim:

1. A ringing trip circuit for connection in series with a subscriber's line comprising a resistor for connection in series with a subscriber's line, a low-pass filter having input terminals connected across the resistor to supply d.c. voltage from said resistor to filter output terminals, a detecting device connected to receive the d.c. voltage appearing on the output terminals of the filter and responsive thereto to provide an a.c. voltage across detecting device output terminals, means coupled to receive the a.c. voltage from the detecting device, said means including a switching device, and said means responding to receipt of said a.c. voltage to operate the switching device to enable disconnection of a subscriber's line from a source of ringing current.

2. A circuit as claimed in claim 1, in which the detecting device includes an oscillator, and the oscillator is responsive to the d.c. voltage to provide said a.c. voltage.

3. A circuit as claimed in claim 1, in which the detecting device includes an oscillator to provide the a.c. voltage in response to the d.c. voltage, and the oscillator includes a transistor coupled to the primary windings of a transformer.

4. A circuit as claimed in claim 1, in which the detecting device includes an oscillator responsive to the presence of the d.c. voltage to produce the a.c. voltage, the oscillator includes a transistor coupled to the primary windings of a transformer to produce the a.c. voltage across said windings, said means coupled to receive the a.c. voltage from detecting means includes rectifier means, and the secondary windings of the transformer are coupled through the rectifier means to the switching device.

* * * * *